United States Patent
Opitz

[15] 3,686,302
[45] Aug. 22, 1972

[54] PROCESS FOR THE MANUFACTURE OF MONOCHLOROACETYL CHLORIDE

[72] Inventor: Wolfgang Opitz, 22 Gartenstrasse, Knapsack near Cologne, Germany

[73] Assignee: Knapsack Aktiengesellschaft, Knapsack near Cologne, Germany

[22] Filed: Oct. 15, 1969

[21] Appl. No.: 866,527

[30] Foreign Application Priority Data

Oct. 22, 1968 Germany..........P 18 04 436.5

[52] U.S. Cl. ............................................. 260/544 Y
[51] Int. Cl. .............................................. C07c 53/20
[58] Field of Search ................................. 260/544 Y

[56] References Cited

UNITED STATES PATENTS 2,848,491  8/1958  MacKenzie............260/544 Y
3,318,950  5/1967  Christoph et al. ......260/544 Y

*Primary Examiner*—Lorraine A. Weinberger
*Assistant Examiner*—E. Jane Skelly
*Attorney*—Connolly and Hutz

[57] ABSTRACT

Production of monochloroacetyl chloride by reacting monochloroacetic acid with phosgene at an elevated temperature. Gaseous phosgene is introduced into a monochloroacetic acid melt heated to a temperature between about 90° and 130° C and having a finely divided catalyst therein, consisting of one or more noble metals belonging to group VIII of the periodic system, or a suitable salt thereof, crude monochloroacetyl chloride in vapor form is continually removed from the reaction mixture, the vaporous matter is condensed and distilled to isolate pure monochloroacetyl chloride therefrom.

4 Claims, 1 Drawing Figure

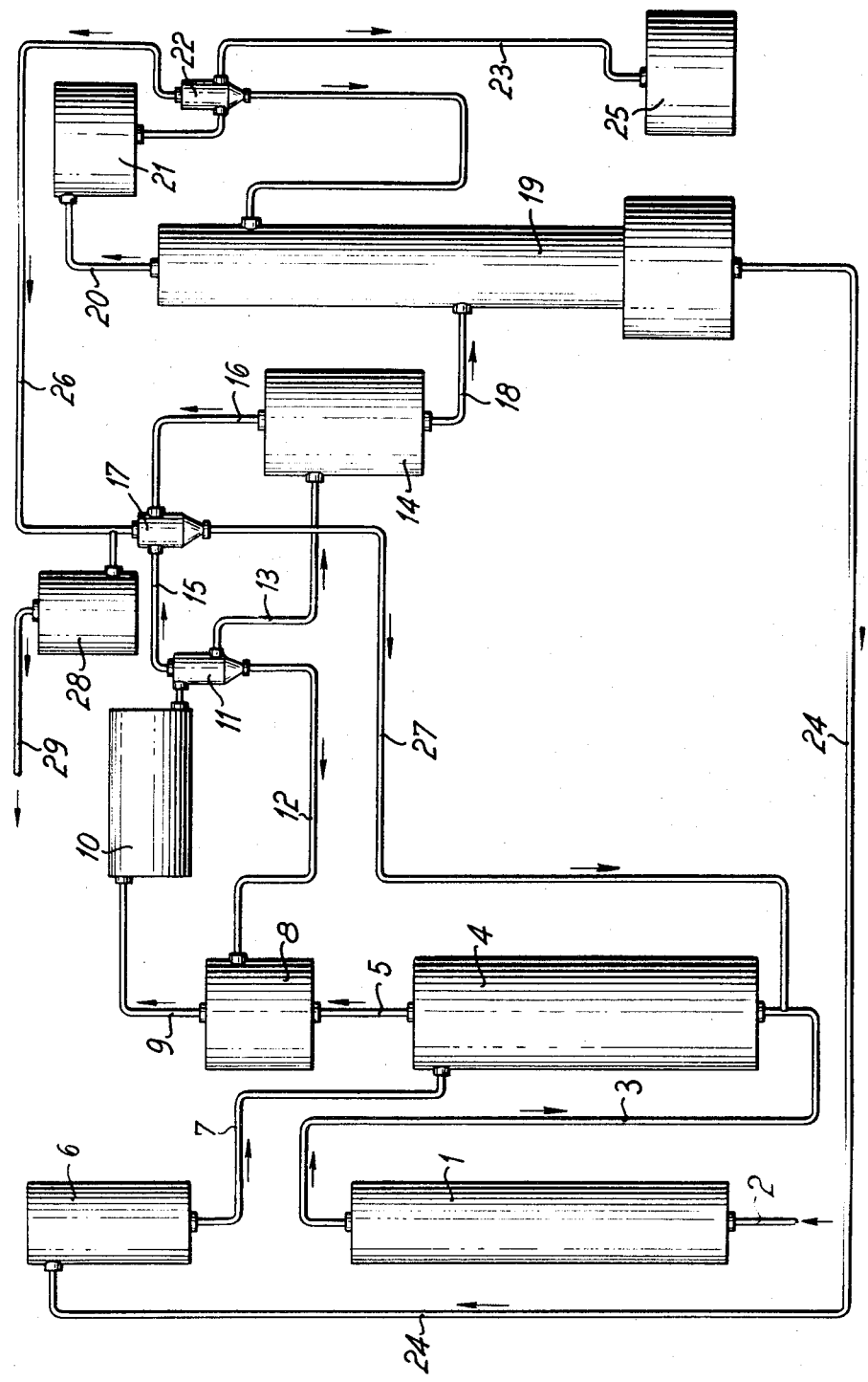

PROCESS FOR THE MANUFACTURE OF MONOCHLOROACETYL CHLORIDE

The present invention relates to a process for the manufacture of monochloroacetyl chloride by reacting monochloroacetic acid with phosgene in contact with a catalyst consisting of one more noble metals belonging to groups VIII of the periodic system, or a suitable salt thereof.

It is known that monochloroacetyl chloride can be produced in conventional manner by processes comprising either chlorinating acetyl chloride with chlorine gas or reacting monochloroacetic acid with phosphorus trichloride or thionyl chloride and distilling the resulting reaction mixture to isolate monochloroacetyl chloride therefrom. The chlorination with the use of chlorine gas is not fully satisfactory bearing in mind that monochloroacetyl chloride is obtained together with dichloroacetyl chloride as a by-product which is difficult to separate therefrom. Two facts handicap the use of phosphorus trichloride or thionyl chloride as the chlorinating agent; these compounds firstly are rather costly and secondly they make it a difficult procedure to obtain the monochloroacetyl chloride completely free from sulfur or phosphorus compounds.

In German Specification No. 283,896, it has been suggested that monochloroacetyl chloride be produced by reacting monochloroacetic acid with phosgene, in the gas phase. For example, it is suggested therein that a stream of phosgene gas be passed together with molten chloroacetic acid through a tubular reactor heated to 200°C and filled with charcoal particles, and that the vaporous matter issuing from the tubular reactor be liquefied by cooling it, and monochloroacetyl chloride be isolated therefrom. This process has failed to gain commercial interest because of the necessary high reaction temperatures of 200°C which give rise to partial decomposition and resinification of the monochloroacetic acid.

Phosgene as a halogenating agent has, however, the advantage of inhibiting the formation of by-products difficult to isolate from the reaction product. For this reason, attempts have been made to modify the process described in German Specification No. 283,896 and run it under conditions which enable the monochloroacetic acid to be kept free from decomposition and resinification phenomena, such as those normally accompanying this known process. This object has been achieved by the present invention.

The process of the present invention for the manufacture of monochloroacetyl chloride by reacting monochloroacetic acid with phosgene at an elevated temperature comprises more particularly introducing gaseous phosgene into a monochloroacetic acid melt heated to a temperature of between about 90° and 130°C and having a finely divided catalyst therein, consisting of one or more noble metals belonging to group VIII of the periodic system, or a suitable salt thereof, continually removing crude monochloroacetyl chloride in vapor form from the reaction mixture, condensing the vaporous matter and distilling it to isolate pure monochloracetyl chloride therefrom.

The catalyst-containing melt of monochloroacetic acid is preferably used at a temperature of substantially 110°C and the melt preferably contains the catalyst in a concentration between about 0.05 and 0.3 weight percent. The anion of the noble metal salt used as the catalyst may be, for example, a chloride or nitrate. More particularly palladium chloride is the catalyst used in carrying out the process of the present invention.

The process of the present invention can be carried out batchwise or in continuous fashion. In this latter case, fresh monochloroacetic acid and phosgene are added to the reaction mixture at the same rate as crude monochloroacetyl chloride in vapor form issues from the reaction mixture.

A particularly advantageous and economic feature of the present invention comprises reacting monochloroacetic acid with a chlorine-free phosgene crude product, such as that obtained in the production of phosgene from carbon monoxide and chloride in contact with active carbon.

The continuous execution of the present process using the above chlorine-free phosgene crude product will now be described by way of example with reference to the accompanying flow scheme.

A generator 1 having active carbon therein is supplied through line 2 with chlorine gas and carbon monoxide (the carbon monoxide is used in excess) and the compounds are reacted therein at a temperature of substantially 50°C to give phosgene. A gas mixture consisting of phosgene and carbon monoxide issues near the head of generator 1. It travels through line 3 to reactor 4 heated to a temperature substantially of 110°C and filled with a mixture comprising molten monochloroacetic acid and palladium chloride as the catalyst. Reactor 4 is fed with fresh monochloroacetic acid and phosgene crude material at the rate necessary to keep pace with the progressing reaction therein which is accompanied by the formation of monochloroacetyl chloride, and the escape of gaseous or vaporous reaction product from reactor 4 through line 5, the monochloroacetic acid being supplied from reservoir 6, through line 7. A vaporous reaction product consisting of chloroacetyl chloride, hydrogen chloride, $CO_2CO$ and relatively small fractions of unreacted phosgene, monochloroacetic acid and its anhydride, issues near the head of reactor 4. It first travels through column 8 and line 9 and is cooled then in condenser 10 down to a temperature at which the chloroacetyl chloride desired to be produced is substantially condensed. Condenser 10 has cooling water therein. The condensate coming from condenser 10 is conveyed to an intermediary container 11 having a branch line 12 connected thereto through which a condensate portion is recycled to column 8, the bulk or balance portion of the condensate being conveyed through line 13 to separator 14. The intermediary container 11 and separator 14 have ventilating pipes 15 and 16 connected thereto which are arranged to run to a further intermediary container 17. Container 17 receives all gaseous matter uncondensable in condenser 10, such as hydrogen chloride, carbon monoxide and carbon dioxide, as well as uncondensed phosgene and chloroacetyl chloride. To recover pure monochloroacetyl chloride, the crude material coming from separator 14 is introduced through line 18 in distilling column 19 and distilled therein. Unreacted phosgene and pure monochloroacetyl chloride are removed near the head of column 19 through line 20.

Monochloroacetic acid and its anhydride accumulate in the base portion of column 19. The base or sump product is recycled through line 24 to reservoir 6. The vaporous head product coming from column 19 is delivered to condenser 21 to liquefy the monochloroacetyl chloride therein and effect separation from uncondensable gaseous phosgene. The phosgene is finally separated from the liquefied monochloroacetyl chloride in separator 22, and liquid, pure monochloroacetyl chloride is delivered through line 23 to reservoir 25. Recovered phosgene gas is first conveyed through line 26 to intermediary container 17 and recycled then from container 17 to reactor 4, through lines 27 and 3. Uncondensable gaseous matter including minor proportions of phosgene and chloroacetyl chloride, delivered to intermediary container 17 through lines 15 and 16, is cooled in condenser 28, which has a cooling brine therein and is operated substantially at −40°C, down to a temperature at which the phosgene commences to be liquefied. The liquefied phosgene obtained in container 17 is recycled to reactor 4, through lines 27 and 3. Gaseous material uncondensable in condenser 28, which includes hydrogen chloride, carbon dioxide and monoxide, is removed through line 29.

The fact that the monochloroacetyl chloride produced in accordance with the present invention is completely free of by-products, and the fact that the phosgene chlorinating agent is an inexpensive feed material are two advantages which favorably distinguish the present process from conventional chlorination methods carried out with the use of phosphorus trichloride or thionyl chloride. The process of the present invention also distinguishes favorably from that reported in German Specification No. 283,896, namely in that it is carried out at a substantially lower reaction temperature, in liquid phase without decomposition of the monochloroacetic acid, particularly in the case of continuous production.

EXAMPLE:

Reactor 4 was fed with 4,000 grams molten, commercially pure monochloroacetic acid having 4 grams $PdCl_2$ therein and containing 98.5 weight percent monochloroacetic acid, 0.6 weight percent dichloroacetic acid, 0.6 weight percent water and 0.3 weight percent acetic acid. Reactor 4 was heated to reaction temperature (110°C) and phosgene gas was introduced thereinto at a hourly rate corresponding to the quantity of phosgene gas produced by reaction of 50 liters chlorine gas with 55 liters CO-gas in generator 1, at 50°C in contact with an active carbon catalyst. The phosgene gas was free from chlorine. Gaseous monochloroacetyl chloride which evolved in reactor 4 was continually removed overhead, and reactor 4 was fed simultaneously with 195 grams/hr monochloroacetic acid coming from reservoir 6 and travelling through line 7.

The resulting crude product which accumulated in separator 14 was composed of:

76.5 weight percent monochloroacetyl chloride
0.1 weight percent dichloroacetyl chloride
8.7 weight percent phosgene
7.7 weight percent monochloroacetic acid
7.0 weight percent monochloroacetic anhydride.

The crude product was distilled and monochloroacetyl chloride with a purity of 99.8 percent was obtained in a yield of 97.1 percent, based on the concentration of monochloroacetic acid in the feed material.

I claim:

1. The process for the production of monochloroacetyl chloride by reacting monochloroacetic acid with phosgene in the presence of a catalyst which includes the steps comprising providing a monochloroacetic acid melt heated to a temperature between about 90° and 130°C and having a finely divided catalyst therein, consisting essentially of palladium chloride, in a concentration of between about 0.05 and 0.03 weight percent related to the monochloroacetic acid melt, introducing gaseous phosgene into said monochloroacetic acid melt, continually removing crude monochloroacetyl chloride in vapor form from the reaction mixture, condensing the vaporous matter and distilling it to isolate pure monochloroacetyl chloride therefrom.

2. The process as claimed in claim 1, wherein fresh monochloroacetic acid and phosgene are added to the reaction mixture at the same rate as crude monochloroacetyl chloride in vapor form issues from the reaction mixture.

3. The process according to claim 1 wherein the temperature of said melt is about 110°C.

4. A process according to claim 1 wherein said phosgene is chlorine free and has been obtained by reacting carbon monoxide with chlorine in contact with active carbon.

* * * * *